United States Patent
Klask

(10) Patent No.: US 7,100,118 B1
(45) Date of Patent: Aug. 29, 2006

(54) GRAPHICAL USER INTERFACE ENGINE FOR EMBEDDED SYSTEMS

(75) Inventor: Kenneth J. Klask, San Jose, CA (US)

(73) Assignee: Amulet Technologies, LLC, Santa Clara, CA (US)

( * ) Notice: Subject to any disclaimer, the term of this patent is extended or adjusted under 35 U.S.C. 154(b) by 986 days.

(21) Appl. No.: 09/692,997

(22) Filed: Oct. 20, 2000

Related U.S. Application Data

(63) Continuation of application No. 09/263,148, filed on Mar. 5, 1999, now abandoned.

(51) Int. Cl.
   *G06F 15/163* (2006.01)
(52) U.S. Cl. .................... 715/764; 345/532; 345/543; 345/535
(58) Field of Classification Search ............. 345/532, 345/764, 535, 543; 715/764, 532, 535, 543
   See application file for complete search history.

(56) References Cited

U.S. PATENT DOCUMENTS

| | | | | |
|---|---|---|---|---|
| 5,727,159 | A | | 3/1998 | Kikinis .................. 395/200.76 |
| 5,760,789 | A | * | 6/1998 | Inoue ......................... 345/501 |
| 5,805,442 | A | | 9/1998 | Crater et al. ................ 364/138 |
| 5,815,167 | A | * | 9/1998 | Muthal et al. .............. 345/541 |
| 5,956,487 | A | | 9/1999 | Venkatraman et al. . 395/200.48 |
| 5,959,640 | A | * | 9/1999 | Rudin et al. ................. 345/535 |
| 5,973,696 | A | | 10/1999 | Agranat et al. ............. 345/357 |
| 5,982,445 | A | * | 11/1999 | Eyer et al. .................. 348/461 |
| 5,991,795 | A | * | 11/1999 | Howard et al. ............. 709/201 |
| 5,995,120 | A | * | 11/1999 | Dye ............................ 345/543 |
| 6,011,537 | A | * | 1/2000 | Slotznick ................... 345/115 |
| 6,089,453 | A | * | 7/2000 | Kayser et al. .............. 235/383 |
| 6,118,462 | A | * | 9/2000 | Margulis .................... 345/535 |
| 6,914,605 | B1 | * | 7/2005 | Kishi et al. ................. 345/520 |

OTHER PUBLICATIONS

Corcoran et al. disclose "User interface technologies for home appliances and networks", IEEE Trans. Consumer Elect.; pp. 679-685, Jun. 1998.*

Arik Hesseldahl, "A chip That Makes Electronics Easier To Use", Forbes.com-Magazine Article, downloaded on Mar. 22, 2004 from http://www.forbes.com/2004/03/18/cx_ah_0318chips_print.html, pp. 1-2.

Niall Murphy, "Should you integrate a GUI into an existing design by adding a second processor or upgrading the existing one? Here are some options", GUI add-on options, downloaded on Jun. 27, 2003 from http://www.embedded.com/shared/printableArticle.jhtml?articleID=9901165, 5 pages.

(Continued)

*Primary Examiner*—Raymond J. Bayerl
*Assistant Examiner*—Dennis G. Bonshock
(74) *Attorney, Agent, or Firm*—Patent Law Group LLP

(57) ABSTRACT

In an embedded system, for instance in a household appliance, in addition to the usual embedded microprocessor/microcontroller there is provided another processor which actually executes a user interface HTML document for accepting user input, for instance from a keypad and controlling the display device, for instance an LCD. The embedded microprocessor hosts the user interface document, responds to requests from the other processor, keeps track of changes in variables shared with the other processor, and executes the control device functionality. The other processor renders the graphical user interface to the display and interacts with the user by executing local functions to operate on the memory and i/o resources of the embedded processor as described by the user interface document served to it.

21 Claims, 6 Drawing Sheets

OTHER PUBLICATIONS

Tom Cantrell, "Liquid Crystal Delight", Circuit Cellar, Issue 132, Jul. 2001, downloaded from www.circuitcellar.com, pp. 1-6.

Jeff Bachiochi, "GUI Interfacing A Straightforward, Simple Solution", Circuit Cellar, Issue 150, Jan. 2003, downloaded from www.circuitcellar.com, pp. 72-77.

Jerry Shapiro, "Hard Solutions to Soft Problems", reprinted from Information Display, Jan. 2003, 4 pages.

Jude DeMeis, "Tool saves time in LCD-interface design", downloaded on Jun. 27, 2003 from http://www.manufacturing.net/dn/index.asp?layout=articlePrint&articleID=CA202583, 1 page.

Agranat: "Engineering Web Technologies for Embedded Applications" IEEE Internet Computing May-Jun. 1998, IEEE, USA, vol. 2, No. 3, pp. 40-45, XP002146066, ISSN: 1089-7801.

Smith: "Graphics in embedded systems: Add HTML to Java- and C-based user-interface options" EDN (US Ed.) (USA), EDN (US Edition), 18, vol. 44, No. 4, pp. 95-96, 98, 100-101, XP002146067, ISSN: 0012-7515.

Varhol: "Embedding the Web" Computer Design, US, Pennwell Publ. Littleton, Massachusetts, vol. 36, No. 12, Dec. 1, 1997, pp. 77-80, 82-84, XP000754855, ISSN: 0010-4566.

David Simpson, "Aesthetics to the Fore," Appliance, Nov. 2005, pp. 42-47.

Ken Klask, "How to simplify develpment of the Graphic User Interface," Appliance Design, Jul. 2005, 4 pages.

"Tracking Fabless, IP & Design-House Startups," Inside Chips Ventures, Dec. 2004, 2 pages.

Warren Webb, "Hidden Insight," EDN, Oct. 28, 2004, 6 pages.

William Wong, "3.8-in. Smart LCD Fits Mobile Applications," Electronic Design, Oct. 18, 2004, 1 page.

Nancy Friedrich, "Graphical-User-Interface Module Eases Integration," Wireless Suystems Design, Oct. 2004, 1 page.

"Amulet Delivers Compact Graphical User Interface Display Modules for Handhelds," Mobile Letter, Oct. 11, 2004, 1 page.

Jon Titus, "Exclusive Hands-on Review Display Kits," Design News, Jun. 28, 2004, 9 pages.

"Display Modules Simplify Design," Display Series, Part 2, Electronic Components News, Jun. 2001, 3 pages.

Automation Excellence Award, presented by Instrumentation & Automation News to Amulet Technologies on Nov. 2003, 1 page.

Best New Product of the Year 2003, presented by Design News to Amulet Technologies, 1 page.

* cited by examiner

```
switch (rsc.Type) {
    case Variable:
        switch (rsc.ID) {
            case 0:
                varPtr = &var0;
                break;
            .
            .
            .
            case n:
                varPtr = &varn;
                break;
        }
        if (rsc.Action==write) {
            *varPtr=rsc.Data;
        }
        else {
            rsc.Data= *varPtr;
        }
        ackClient(rsc);
        break;

case Function:
        switch (rsc.ID) {
            case0:
                funct0(&rsc);
                break;
            .
            .
            .
            case n:
                functn(&rsc);
                break;
        }
        ackClient(rsc);
        break;
    case File:
        .
        .
        .
        break;
}
```
Request Handler Source Code ~ 92

Key To

GRAPHICAL USER INTERFACE ENGINE FOR EMBEDDED SYSTEMS

CROSS REFERENCE TO RELATED APPLICATIONS

This application is a continuation of application Ser. No. 09/263,148, filed Mar. 5, 1999, now abandoned.

FIELD OF THE INVENTION

This invention relates to computer systems and more specifically to embedded systems, i.e. other than general purpose programmable computers.

BACKGROUND

Embedded systems are well known; this refers to microprocessors and microcontrollers (hereinafter generically referred to as microprocessors) used in devices other than general purpose computers. For instance many household appliances (such as microwave ovens) have embedded microprocessors which control operation of the appliance. The microprocessor typically accepts user input, for instance from the keypad of the microwave oven, and controls operation of the microwave oven, for instance the level of heating and duration of cooking. The embedded microprocessor also controls the device display which in a microwave oven is a small LCD (liquid crystal display). That is, the intelligence of such appliances resides in the embedded microprocessor, which interfaces to the human user. Typically this is done through firmware, i.e. computer software executed by the embedded microprocessor and stored in a memory associated with, or a part of, the microprocessor. In addition to executing the software to interact with the controlled device, the embedded microprocessor also accepts and decodes input from the human user, for instance via the keypad, as well as provides visual feedback on the display by providing text and/or graphic information to a display controller which in turn drives the LCD panel.

As shown in the block diagram of FIG. 1, the embedded microprocessor 10 (in the drawing designated by the alternative terminology "microcontroller") is a commercially available device, for instance an 8 or 16-bit microcontroller of the type available from a number of vendors. This embedded microprocessor conventionally includes, in addition to its logic circuitry, storage such as ROM (read only memory) which holds what is called firmware 12, which is a type of computer software, and also conventional RAM (random access memory) which is not shown. Firmware 12 performs the indicated functions of application flow, device control (of the controlled device of which the embedded microprocessor is a part) reaction to user input, and the capability to draw pixels to the display controller 24 frame buffer 30.

As shown, the microprocessor 10 is coupled to a user input device 14, e.g. a keypad, an infrared remote controller such as used on television sets, or a touch screen input device. The associated controlled device (not shown) is, for instance, an appliance such as a microwave oven, washing machine, or automobile system, or a scientific instrument, or a machine tool, and is connected conventionally to microprocessor 10. It is to be appreciated that the lines connecting the blocks in FIG. 1 represent buses, that is, parallel multiline connections. The embedded microprocessor 10 supplies input (commands) from the human user via the user input device 14 to control the controlled device and gives user indications on the display 20. Display 20 is driven via conventional pixel drivers/video circuitry 22. The user input device 14, of course, does not directly affect the controlled device, nor does it directly control the display processor 20. Instead, the embedded microprocessor 10 accepts and decodes the user input from the user input device 14, then controls the controlled device and provides information to the user on display 20. Similarly, the display device 20 does not directly display information from the user input device 14, nor the controlled device; instead it only displays information provided to it by the embedded microprocessor 10. This display takes place via the display controller 24, which is often a separate, commercially available, integrated circuit. Display controller 24 includes several well known elements which are the microcontroller (microprocessor) bus interface 28, which drives the frame buffer 30 and the associated LCD/video interface 34. As shown, the display device is for instance an LCD (liquid crystal display), VFD (vacuum fluorescent display), CRT (cathode ray tube), etc.

The FIG. 1 system is well known and has been in use for many years. It is generally suitable for a high volume production products such as household appliances where manufacturing (parts) cost is important and nonrecurring engineering charges for developing software are relatively less important. The reason for this is that the firmware executed by the microprocessor 10 must be customized for each class of controlled device, as well as for the user input device 14 and the display 20. This requires a substantial amount of software engineering effort. However, this approach is less well adapted for non-mass-produced products such as industrial control systems, or limited production products where the software engineering costs are relatively more important than the costs of the integrated circuits. Also, even for mass produced products that are subject to frequent changes in the firmware to be executed by the embedded microprocessor 10, the costs of changing the firmware are high and the FIG. 1 approach is relatively expensive and inefficient. Hence, this approach has significant drawbacks in terms of development time and engineering cost.

SUMMARY

In accordance with this invention, a control system, for instance an embedded control system for controlling a device, operates such that the burden of accepting human user (or machine) input and providing information (output) to a human user or a machine via, e.g., a display is shifted from the embedded microprocessor to a second processor. The second processor, designated here a "hypertext" processor, is e.g. a microprocessor, microcontroller, or similar structure capable of processing a hypertext markup language document, as explained below. The embedded control system controls and/or monitors the controlled device and is application specific, unlike for instance a personal computer which can run any application program. The display controller of FIG. 1 is effectively eliminated and its functions instead associated with the hypertext processor. Both the user (or machine) input device and the display (or other output device) are coupled to the hypertext processor and not to the embedded microprocessor. The hypertext processor is a second, e.g., microprocessor which may be on a chip separate from the embedded microprocessor.

The hypertext processor determines what operations to take upon receipt of, e.g., user input, for instance from a connected keypad. The hypertext processor performs actions described in the hypertext markup language document and commands the embedded microprocessor to act on the controlled device and to update its internal shared variables. The hypertext processor also updates the display as a function of the shared variables internal to the embedded microprocessor. The user interface software (code) is not resident in the hypertext processor, nor is it executed/interpreted by the embedded microprocessor. Instead, a (hypertext) document describing the user interface is external to the hypertext processor, and resident in the memory space of the embedded microcontroller or in a serial memory device (i.e. serial EEPROM, FLASH ROM, smart card, etc.). This hypertext document describing the user interface is provided ("served") to the hypertext processor at the request of the hypertext processor. Thus the user interface is actually executed by the hypertext processor even though it does not permanently reside there.

In one embodiment, the user interface document is encoded in a particular hypertext markup language (HTML) called here μHTML. The generic name "Hypertext Markup Language" refers to:

Hypertext—A method for providing links within and between documents; popularized by multimedia authoring systems which used the hypertext concept to link the content of a text document to other documents encoded in certain multimedia formats.

Markup Language —A method for embedding special control codes (TAGS) that describe the structure as well as the behavior of a document.

Like conventional HTML, PHTML files ("documents") contain both control information (markup tags) and content (ASCII text), which together describe the appearance and content of a user interface. In addition, both markup languages provide capability to reference resources external to the document. Compared to conventional HTML, μHTML is smaller, easier to interpret, and defines a special library of GUI (graphical user interface) objects, data processing objects suitable for pipelining, and other system utilities common to embedded systems software. One key feature of μHTML is its ability to describe the interface to resources distributed among networked embedded subsystems and to link the data of these resources to the functions of a host processor.

In order to make μHTML easy to parse, it is headed by a directory of pointers to each tag. To make it compact, each tag is represented by a single byte (hereinafter referred to as an opcode). Following each opcode is a unique set of binary properties data, such as X-Y coordinate information, pointers to other resources, and other properties. There is a unique opcode for each object in the GUI object library. These objects are, e.g., push buttons, pop-up lists, and other sorts of visual (or aural) indicators. There are also opcodes for objects that contain methods to process or redirect data to and from other objects or external resources, e.g., an object referencing a variable from "external resource 0" may sample the variable data every 100 mS, and route the results to another object referencing a variable from "external resource 1". Each library object opcode is followed immediately by a data structure unique to the object. The data contained in the data structure is specific to the instance of the library object. In this way, the memory allocated for each instance of all used objects is statically allocated in the memory buffering the μHTML document. When external resources are referenced, a data structure is provided to describe the format of the messages required to provide access to the external resource. For instance, to read a variable associated with an external device, the data structure describes a "Get" command and a "Return" response. Typically the Get command contains an identification to some external device and an index into a lookup table on the external device that provides references to variables, functions or files. In addition to the external device identification and lookup table index, the Return response also contains the data requested.

In one embodiment this user interface hypertext document is developed using conventional internet web page development tools of the type commercially available; this is not limiting. User interface objects are simulated in one embodiment with JAVA applets that correspond to objects in the GUI object library. The simulated GUI objects are referenced from within the conventional HTML document by using the same standard tags used to reference any conventional JAVA applet. Standard HTML tags are also used to format the display content and to point to resources resident to devices external to the hypertext processor.

The user interface document can then be viewed on a conventional web browser, for system development purposes. (Of course this has little to do with the actual user operation of the controlled device but is part of its user interface design and development.) This HTML/JAVA web page can then be converted (pre-compiled) to a more compact μHTML format by a compiler designed specifically to: (1) remove the conventional HTML tags and replace them with a corresponding μHTML opcode; (2) convert the attributes strings of the HTML tags to a binary structure appropriate for the μHTML opcode; (3) replace references to all JAVA applets and parameters with a corresponding opcode and object data; (4) reformat and add additional data to simplify parsing and execution by the hypertext processor, and (5) resolve references to resources external to the hypertext processor (i.e. executable code or variable data resident to an external embedded microprocessor, storage in an external serial memory device, I/O functions of an external serial I/O device, etc.). This is only illustrative of development of a system in accordance with this invention.

Moreover, the present invention is directed to more than a user interface processor. It is additionally directed to use of a hypertext markup language to provide program flow and structure while linking together resources distributed among embedded subsystems, even if the subsystems do not have user interfaces. That is, the invention more broadly contemplates a dedicated processor programmed with a hypertext markup language rather than with conventional application code.

DETAILED DESCRIPTION

Figure 1:
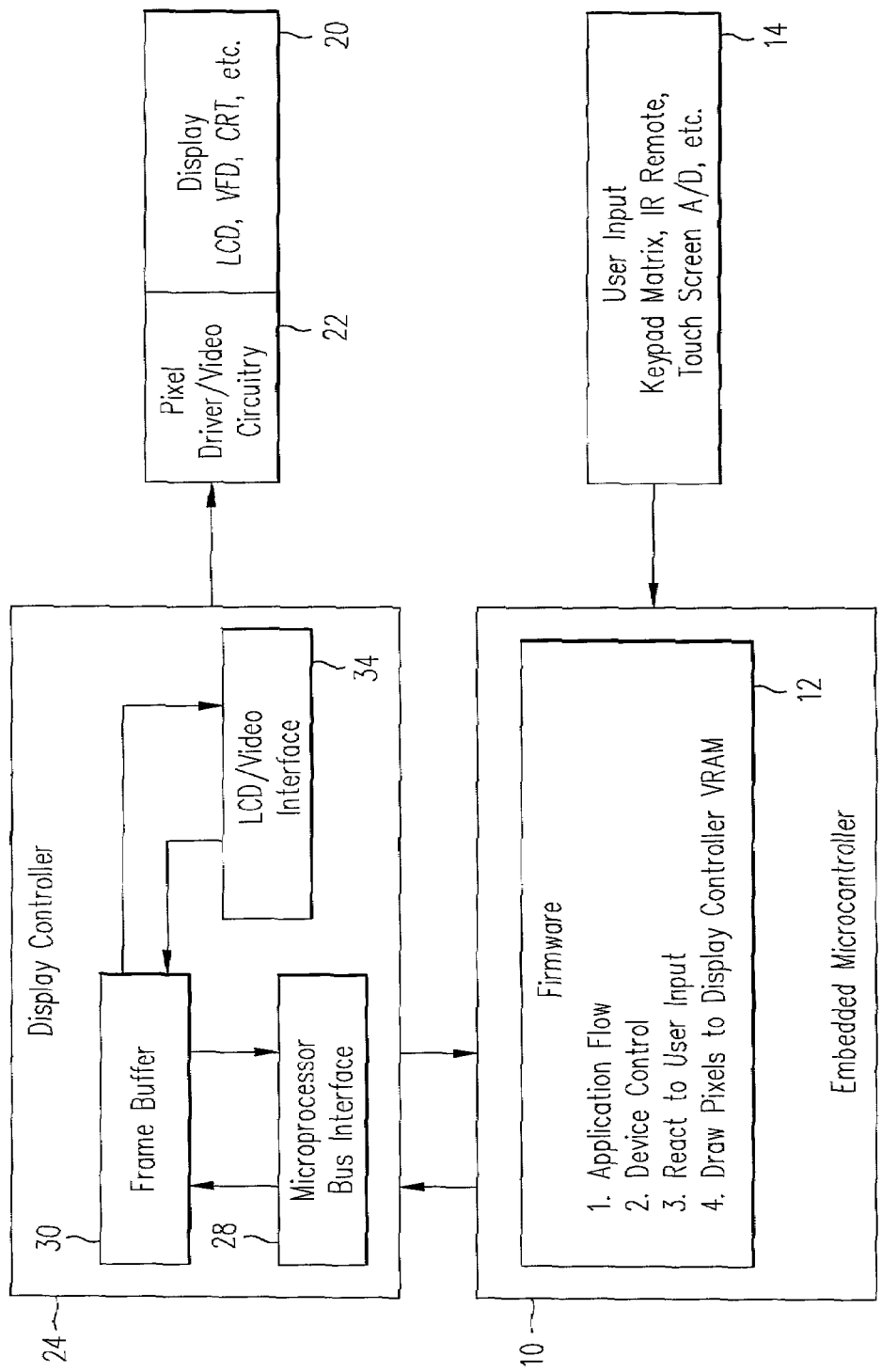
FIG. 1 shows a prior art embedded control system for a controlled device.
Figure 2:
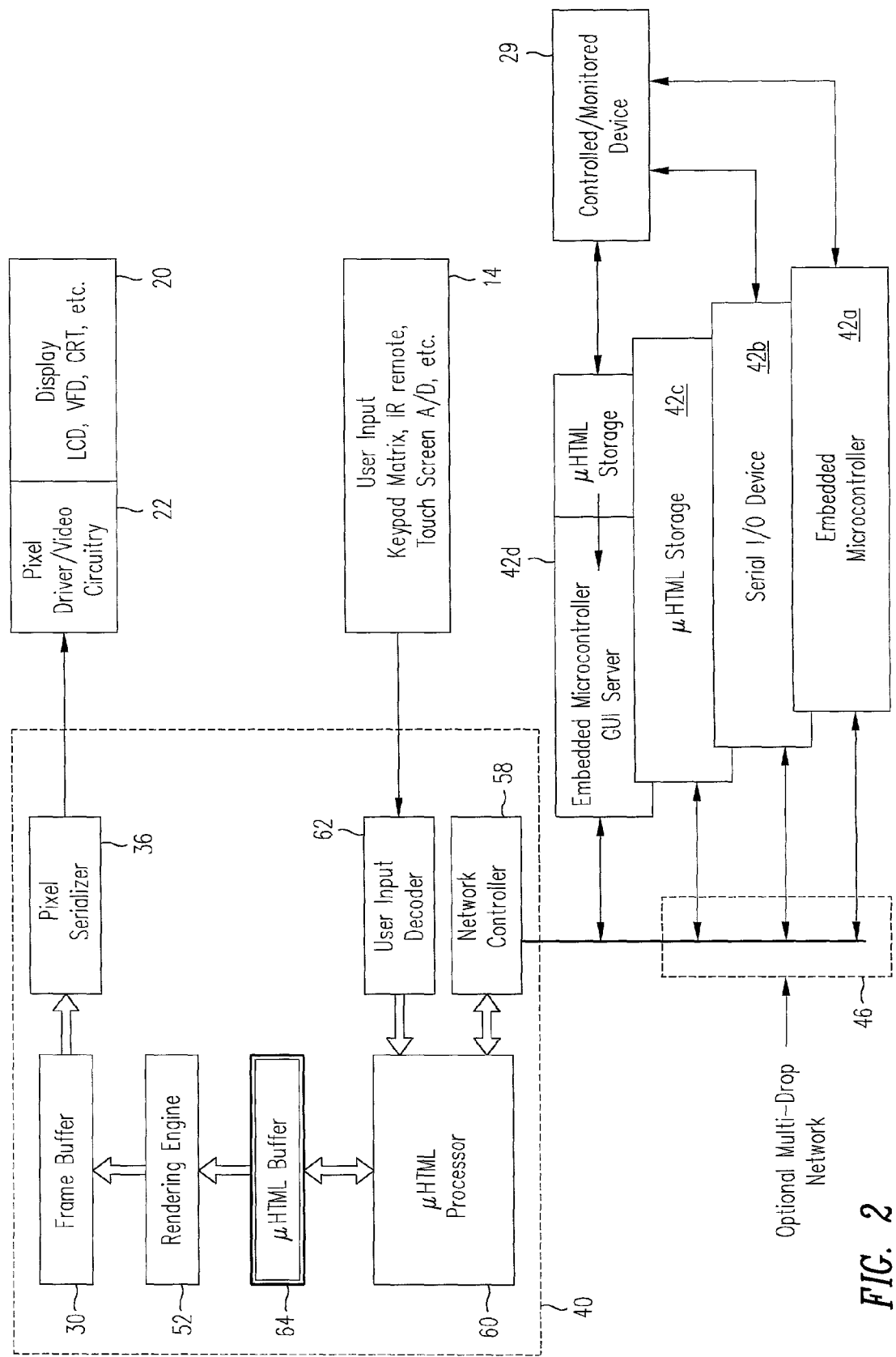
FIG. 2 shows an embedded control system in accordance with this invention.

FIG. 2 shows a block diagram of a control system for a controlled device in accordance with this invention. Blocks similar to those of FIG. 1 have identical reference numbers. In FIG. 2, the display controller 24 of FIG. 1 is replaced by a second hypertext processor 40 which may be (not necessarily) a single integrated circuit and which is an intelligent device, unlike the display controller 24. Thus in the FIG. 2 structure there are two intelligent devices (processors), one of which is the hypertext processor 40 and the second of which is, e.g., the embedded microprocessor (or other device) of which several are shown labeled 42a etc. The hypertext processor 40 interfaces both to the user input device 14 and to the display elements 20, 22. Any networked device such as 42c or 42d that contains storage for the user interface (hypertext) document may serve (provide) the user interface document to the markup language processor 40. Any networked I/O device such as 42a, 42b, or 42d that acts upon a controlled or monitored device 29 may have resources that are referenced by the user interface document(s). "Networked" here refers to device connectivity using standard protocols. It includes both "intra-product" networking (connecting several devices within one enclosure) and "inter-product" networking (connecting devices each in its own enclosure.)

FIG. 2 shows different types of devices optionally connected by a conventional network 46 to markup processor 40. These connected devices include embedded microcontroller 42a, serial I/O (input/output) device 42b, µHTML storage device 42c, and embedded microcontroller GUI server 42d including its own µHTML storage. Of course other connection arrangements are possible with any number or combination of devices or networks connected to the markup language processor 40 as long as there is at least one device, e.g., 42c capable of storing the µHTML document(s). Also, because a single µHTML document may contain links to the resources of different devices on the network, it is not necessary for every device on network 46 to contain storage for µHTML documents.

Although FIG. 2 shows only one controlled device 29 connected to a plurality of devices, there may be one or more such controlled devices that may be controlled (or monitored) by one or more of the networked I/O devices 42a, etc. In addition, the networked I/O 42a, etc. devices may or may not be located in the same physical enclosure. For example, the components of a microwave oven may be networked in the same physical enclosure. However, the components of a home entertainment system (e.g., surround sound receiver/amplifier, VCR, CD/DVD player) may all be networked to a hypertext processor, e.g. in a television set, but each housed in its own physical enclosures.

Also, while the various blocks 30, 40, 20, 22, and 42a, 42b etc. of FIG. 2 in one embodiment are separate integrated circuits, the partitioning amongst the various integrated circuits may be otherwise, for instance, all of the FIG. 2 system may be on a single integrated circuit with the possible exception of the user input device 14, controlled device 29, and display 20. The partitioning of the depicted blocks amongst various integrated circuits is not critical to this invention.

The following describes each functional block of the hypertext processor 40 of FIG. 2:

Network controller 58 formats and transmits all bytes of data queued by the µHTML processor 60 via the network 46. It also decodes any data received from the network 46 and places it in a queue to be processed by the µHTML processor 60.

User input decoder 62 detects and decodes input from user input device 14 which is, e.g., a keypad, touch screen, voice command decoder or IR (infrared) remote device. Decoder 62 places data describing a user input event into a queue to be processed by the µHTML processor 60.

µHTML processor 60 operates on data stored in µHTML buffer 64 to reflect events queued from the user input decoder 62 and network controller 58. Processor 60 is also responsible for generating and queuing events for the network controller 58 in response to system or user events that are linked to such events by the data in the µHTML buffer 64.

µHTML buffer 64 is RAM (random access memory) storage for a complete µHTML document describing all objects to be rendered to the display device 20. Each object contained in the µHTML document may also contain references to other network resources. Buffer 64 is only written to and modified by the µHTML processor 60 in response to user input events, system events or events generated in response to network messages. It is read by both the rendering engine 52 and the µHTML processor 60. µHTML buffer 64 is a section of RAM 72 accessible only by the microprocessor 68 (see FIG. 3).

The rendering engine 52 only reads the graphic information for each UI object as required to properly draw the user interface to the frame buffer 30. The µHTML processor 60 reads the information required to generate system or network events in response to other events related to each UI object.

Rendering engine 52 draws all displayable user interface objects to the frame buffer 30 as described by the data stored in the µHTML buffer 64. It refreshes each UI object when marked as "dirty" in the µHTML buffer 64 by the µHTML processor 60. Rendering engine 52 is firmware executed by microprocessor 68 and stored in ROM 70 (see FIG. 3). Each µHTML object contains code to render all views of the object.

Frame buffer 30 is RAM storage that contains the data for each pixel of the entire displayed page. It is written to by the rendering engine 52 as it draws the user interface on display 20. It is read from by the pixel serializer 36 as it converts the pixel information to signals appropriate to drive the physical display 20. Frame buffer 30 of FIG. 2 is a section of RAM 72 (see FIG. 3) accessible by microprocessor 68 (see FIG. 3) and the pixel serializer 36.

Pixel serializer 36 generates a continuous pixel stream in a format compatible with a specific commercially available physical display 20. As an example, when interfacing to an LCD panel (display 20), the pixel serializer collects and formats each line of pixel data from the frame buffer 30 and synchronizes it with the conventional display driver pixel clock, frame pulse and line pulse signals. The pixel clock signal clocks the pixel data into the display drivers' internal shift register. The line pulse signal indicates the end of a display line while the frame pulse signal marks the first line of the displayed page.

The FIG. 2 structure advantageously allows use of commercially available internet web page authoring tools (such as HTML) to use "drag and drop" graphic user interface authoring for development of microprocessor based embedded systems. Also, it allows a simple and consistent serial interface via network controller 58 to devices 42a, 42b, etc. regardless of the configuration of the display 20. In other words, the intelligence for control of the display 20 is provided in the processor 40 and need not be coded in the embedded microprocessor 42a software.

This eliminates the conventional programming, for example in assembler or C, required to implement graphical user interface objects that are linked to the variables and functions of the embedded microprocessor 10 such as is required in the prior art system of FIG. 1. It also allows development of the program flow by the non-software engineers who typically specify the application for the controlled device 29 of FIG. 2 and thereby understand the application and user interaction, but not perhaps firmware programming. This allows quicker and more accurate program development while freeing up the experienced firmware developers to concentrate on the technical program and also yielding better partitioning of a development project into smaller more manageable chunks that may be developed in parallel.

Figure 3:
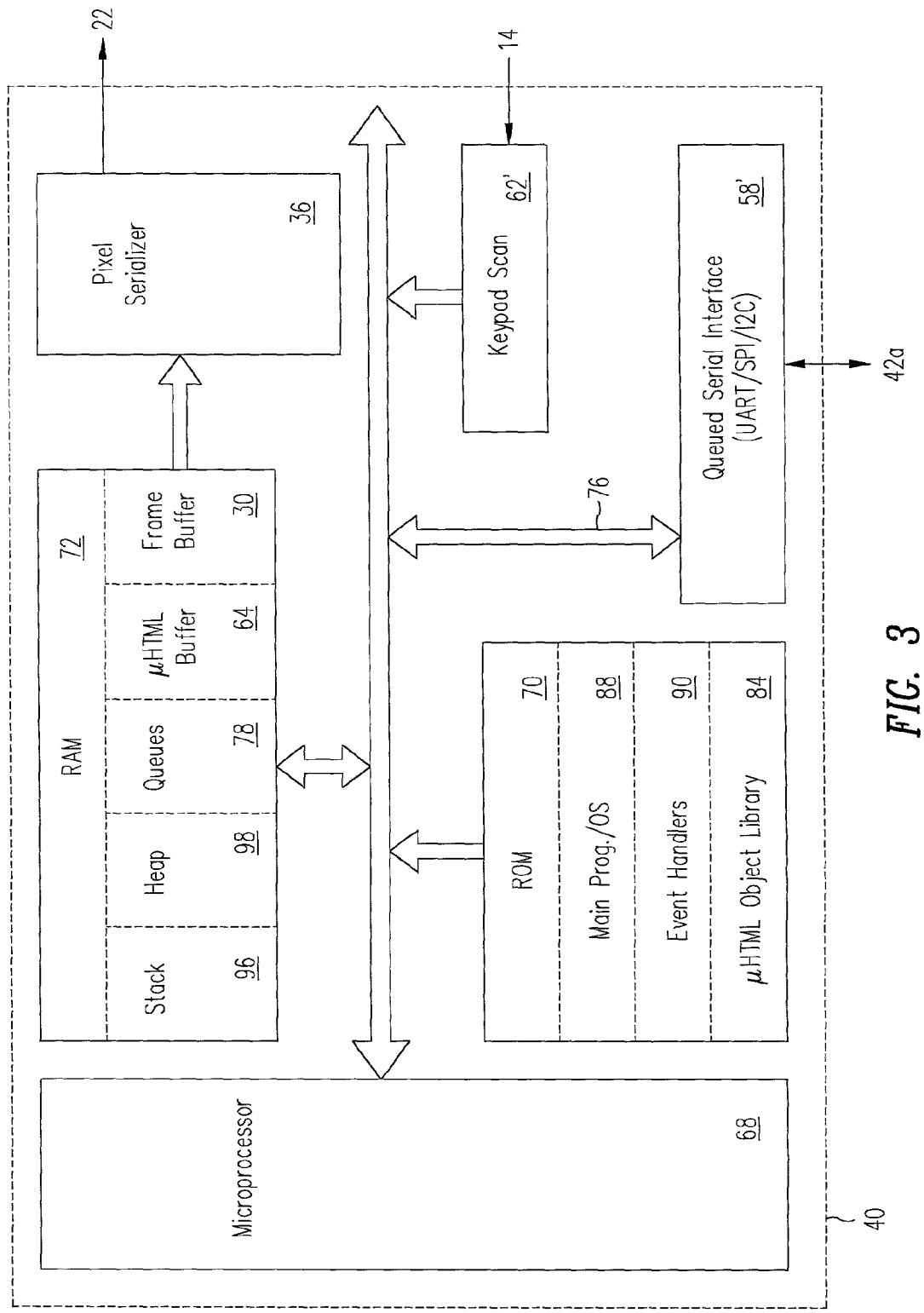
FIG. 3 shows a more detailed diagram of the markup language processor of FIG. 2.

FIG. 3 shows a "hardware" oriented block diagram of the hypertext processor 40 of FIG. 2. Processor 40 connects to one of the embedded devices 42*a* etc. In this case, the protocol engine 58 of FIG. 2 is shown as queued serial interface 58' which is, for instance, a UART/SPI/I²C interface. These are examples of industry standard interfaces suitable for the "intra-product" networking described above. SPI (Serial Peripheral Interface) is a popular synchronous serial communication scheme for networking of integrated circuits contained in embedded systems. It was designed by Motorola and popularized by MAXIM, Harris, SanDisk, and others. It is supported by many microcontrollers and serial I/O devices such as A/D and D/A converters, solenoid drivers, digital potentiometers, real time clocks, EEPROM, FLASH ROM, among many others. I²C-Bus (Inter-IC Bus) is another popular synchronous serial network architecture popularized by Philips and is simpler, but slower than SPI. Like SPI, many serial I/O and storage functions are available. However, many more consumer product functions are available, i.e. television and stereo building blocks. Examples of suitable interfaces for protocol engine 58' for "interproduct" networks are IEEE-1394, USB, or Ethernet. In conjunction with appropriate firmware executed by the microprocessor 68 and stored in ROM 70 protocol engine 58 services interrupts generated by the connected devices and manages queues.

The user input decoder 62 is shown in FIG. 3 as a keypad scan decoder 62' which connects to a keypad 14. In conjunction with appropriate firmware executed by the microprocessor 68 and stored in ROM (read only memory) 70, decoder 62 services interrupts generated by the connected devices and manages queues. The remaining blocks in FIG. 3 support the other functions of markup language processor 40 of FIG. 2. This is accomplished in terms of circuitry by microprocessor "core" (this is the microprocessor without the supporting memory, etc.) 68 which in turn is connected to a standard bus 76 which interfaces as shown to the other blocks within processor 40. Typically, the entire processor 40 of FIG. 3 would be a single integrated circuit.

μHTML Processor 60 of FIG. 2 in FIG. 3 is firmware executed by microprocessor 68 and stored in ROM 70. In addition to routines to service interrupts, handle events and manage RAM 72 based queues 78 and buffers, this also contains a library of routines that operate on and according to the specific data structures of each μHTML object. These objects may contain, but are not limited to, user interface objects, data processing objects and operating system objects. The data for each instance of an object is contained in the μHTML document buffered in the RAM 72 area called the μHTML buffer 64. Each μHTML object in the library 84 in ROM 70 contains code to (1) access and modify the data defining the instance of the object (from μHTML buffer 64), (2) render all views of the object to RAM frame buffer 30, (3) respond to events related to the object and (4) queue messages to be sent to other network resources.

The structures in FIG. 3 include (in ROM 70) main program storage 88 and event handlers 90 and (in RAM 72) stack 96 and heap 98. Pixel serializer 36 of FIG. 2 is depicted as hardware (circuitry) in FIG. 3.

The block diagrams of FIGS. 2 and 3 are descriptive of a range of structures which may be implemented in various combinations of dedicated hardware (circuitry) and software (computer code) executed by various types of processors. The particular partitioning between hardware and software disclosed herein is not intended to be limiting.

Figure 4A:
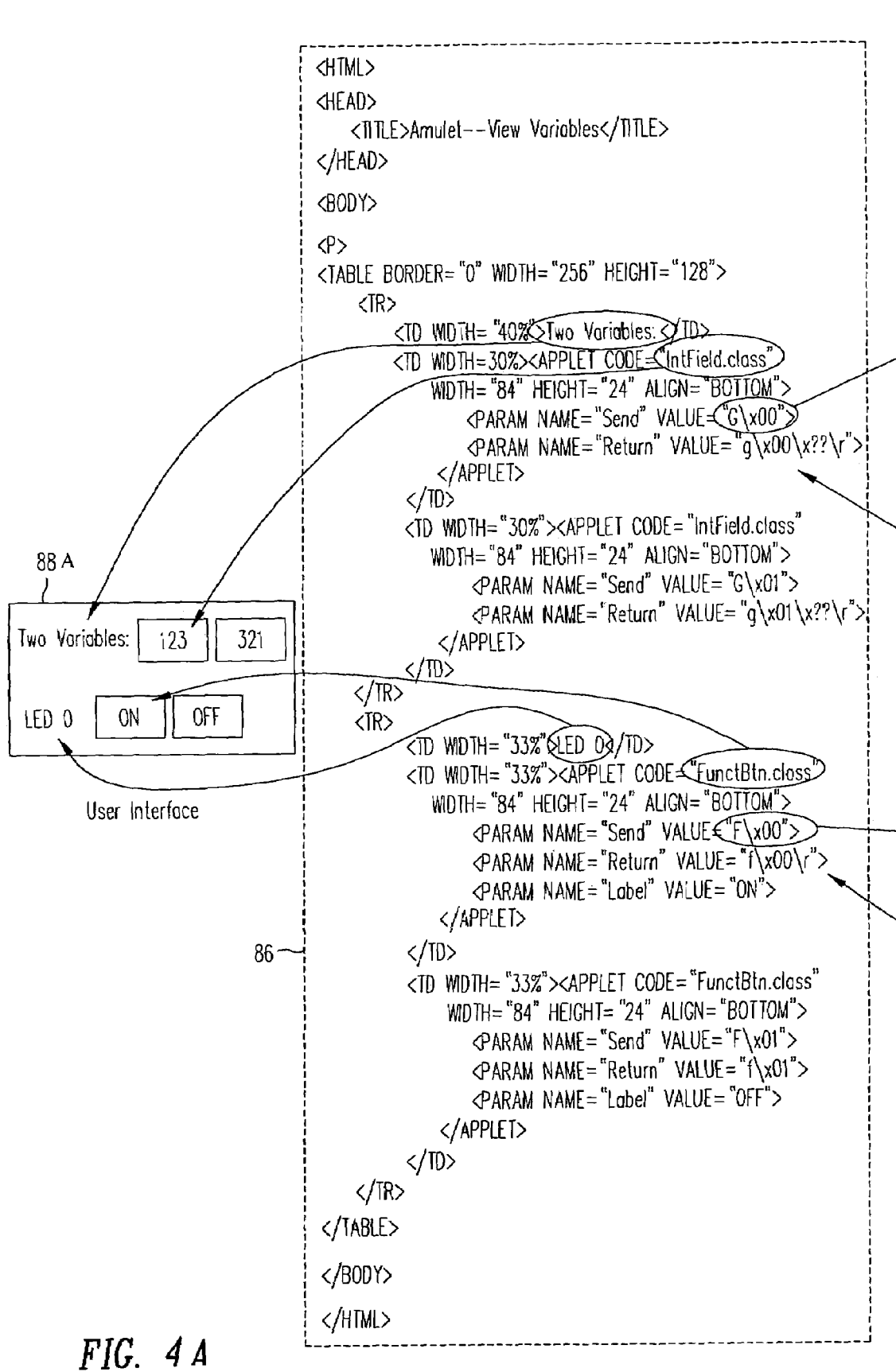
FIG. 4 shows an HTML file and associated request handler in accordance with the invention.
Figures 4, 4B:
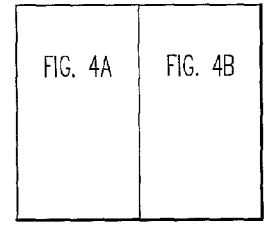

FIG. 4 illustrates an example of an application used in accordance with this invention. Specifically, the central portion of FIG. 4, which is the text 86, is an HTML file, that is a hypertext markup language document which links display items of an LCD display 88A to resources of an embedded microprocessor. The various lines of text in 86 contain either: (1) text to be displayed such as "Two Variables" or "LED 0", or (2) markup tags (enclosed between <and>) to reference GUI object library components and link them to resources external to the HTML document and markup language processor. In this example, the embedded microprocessor resources are accessed through the embedded microprocessor software program 92.

The embedded microprocessor resident resources accessed by program 92 are: two variables in this case containing the values 123 and 321, and two functions that in this case turn on an LED and turn off an LED attached to the embedded microprocessor. The variables are displayed via IntField objects and accessed by sending the commands in the <PARAM Name="Send" . . . > tags. Upon receiving the command to GET a variable, the embedded processor executes the code in 92 to lookup the variable and send the value back via the ackClient routine. The IntField object of the markup language processors GUI Object library parses the response as per the <PARAM Name="Return" . . . > tag to isolate, format and render the value to the LCD's frame buffer.

Likewise the functions referenced by the <PARAM Name="Send" . . . > are invoked when the user activates the buttons rendered by the FunctBtn objects.

Associated with this document 86 is embedded request handler 92, shown in the right hand portion of FIG. 4 with lines relating it to the markup in document 86. This handler 92 is resident in an embedded microprocessor such as, with reference to FIG. 2, 42*a* or 42*d* to provide access to the resources requested via the network. This code in 92 may be implemented in hardware for example in serial memory devices such as, with reference to FIG. 2, 42*c* or in serial I/O devices such as 42*b*. The "client" in the code 92 is a reference to the markup language processor 40. Thus, while the data described by document 86 is actually interpreted by the markup language processor 40, the code 92 is actually executed by the embedded microprocessor 42*a* in conjunction therewith.

Figure 5:
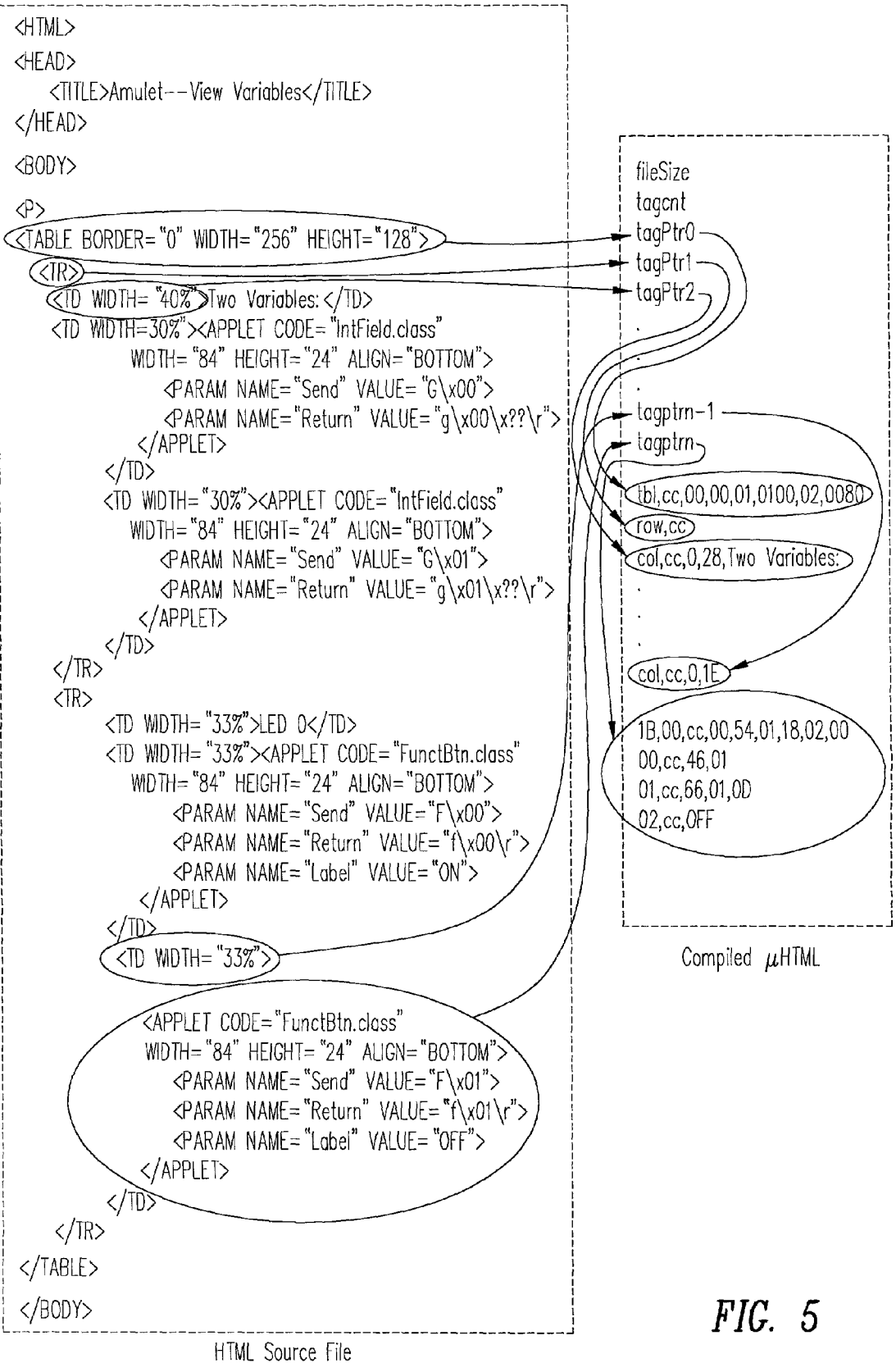
FIG. 5 shows the relationship between the HTML source file of FIG. 4 and a version compiled to μHTML.

FIG. 5 shows a repetition of the HTML source file (left side) 86 of FIG. 4 with a compiled μHTML version of same (right side). This compiled μHTML version is much more compact; the lines relate the source file code to its compiled version. In addition, the μHTML is easier to interpret at runtime, because things such as string lengths, tag offsets, X-Y coordinates are computed by the compiler and built into the structure of the document. Of course there is no requirement to use HTML or μHTML or to compile same, however, this provides efficiencies in carrying out one embodiment of the present invention.

Alternatives to use of the μHTML disclosed here are other forms of text documents with control codes used to access resources located elsewhere. Examples of other markup languages are compact HTML, and HDML. Even the old UNIX "troff" is a markup language which was originally designed for page layout.

Memory devices (such as 42c) (FIG. 2) external to the processor 40 are thereby responsible for "hosting" the µHTML and other files. Whether the external device is another microprocessor 42d, or simply a serial memory device 42c, it reacts to requests from the processor 40 to read or write files. In addition devices 42a etc. connected to the processor 40 may also support requests to read/write variables, invoke functions and provide state information while performing the normal I/O device functionality.

The embedded memory device 42c is thereby responsible for "hosting" the µHTML and other files. It responds to requests from the hypertext processor and keeps track of changes to variables in use by the hypertext processor and executes the controlled device functionality. The hypertext processor is responsible for rendering the graphical user interface to the display. The hypertext processor is also responsible for responding to user input from the user input device by updating display graphics and communicating with external devices to request changes to the values of external variables and to invoke external functions as described by the µHTML document. The hypertext processor is also responsible for responding to changes in the embedded microprocessor variables by updating the display device graphics. Typical requests to the embedded microprocessor by the hypertext processor are: open connection; get file (for instance a µHTML file, an image graphic file or a script); call up functions; get a value of the variable; send value of the variables and obtain status of the embedded microprocessor. "Script" refers here to files that contain code to be executed by the microprocessor portion of the hypertext processor.

This disclosure is illustrative and not limiting; further modifications will be apparent to one skilled in the art in light of this disclosure and are intended to fall within the scope of the appended claims.

What is claimed is:

1. A control system for a device, wherein a graphic user interface ("GUI") controller operates a GUI of the device independently from an embedded controller of the device, the control system comprising:
the embedded controller for controlling and monitoring the device;
a liquid crystal display ("LCD") for displaying the GUI to a user, the GUI including:
  a first GUI object comprising a graphical presentation of a status of the device; and
  a second GUI object comprising a graphical presentation of a command to the device;
a touch screen for detecting the command from the user;
the GUI controller, comprising:
  at least one memory, comprising:
    a document buffer storing a document defining an appearance of the GUI, the document comprising:
      a first operation code ("opcode") identifying the first GUI object;
      a first operand of the first opcode, the first operand identifying a source of the status;
      a second opcode identifying the second GUI object; and
      a second operand of the second opcode, the second operand identifying a destination of the command;
    a data buffer storing the status and the command;
    a GUI object library storing:
      a first set of executable codes defining an appearance and a functionality of the first GUI object, the first set of executable codes comprising instructions for rendering the first GUI object, receiving non-graphical data of the status from the embedded controller, and further rendering the first GUI object to show a visual response to a change to the status;
      a second set of executable codes defining an appearance and a functionality of the second GUI object, the second set of executable codes comprising instructions for rendering the second GUI object, receiving the command from the touch screen, further rendering the second GUI object to show a visual response to a change to the command, and sending non-graphical data of the command to the embedded controller;
    a frame buffer storing at least one complete display frame image of the GUI;
  a GUI processor for rendering the GUI and handling user inputs independently from the embedded controller, wherein:
    the GUI processor is coupled to the touch screen via a touch screen analog to digital converter to receive the command from the user, wherein the touch screen is not directly connected to the embedded controller;
    the GUI processor is coupled to the embedded controller via a serial UART interface to send the non-graphical data of the command to the embedded controller and to receive the non-graphical data of the status from the embedded controller;
    the GUI processor is coupled to the at least one memory via a memory bus interface, wherein:
      in response to the first opcode and the first operand, the GUI processor executes the first set of executable codes to render the first GUI object to the frame buffer independently from the embedded controller, to receive the non-graphical data of the status from the embedded controller, and to further render the first GUI object to the frame buffer to show a visual response to a change to the status independently from the embedded controller;
      in response to the second opcode and the second operand, the GUI processor executes the second set of executable codes to render the second GUI object to the frame buffer independently from the embedded controller, to receive the command from the touch screen independently from the embedded controller, to further render the second GUI object to the frame buffer to show a visual response to a change to the command independently from the embedded controller, and to send the non-graphical data of the command to the embedded controller;
  a pixel serializer coupled to the LCD to continuously refresh the LCD with the complete display frame image in the frame buffer that contains both the rendered first GUI object and the rendered second GUI object.

2. A first controller providing a graphical user interface ("GUI") for a device independently from a second controller that monitors and controls the device, the first controller comprising:
- at least one memory comprising:
  - a document buffer storing a document, the document comprising:
    - a first operation code ("opcode") identifying a first GUI object in the GUI, the first GUI object being a graphical presentation of a parameter, the parameter being from the second controller;
    - a first operand of the first opcode, the first operand identifying the parameter of the first GUI object;
    - a second opcode identifying a second GUI object in the GUI, the second GUI object being a graphic presentation of a user input, the user input being from an input device; and
    - a second operand of the second opcode, the second operand identifying a destination of the user input;
  - a frame buffer for storing at least one complete frame of the GUI including the first and the second GUI objects;
  - a GUI object library storing executable codes defining an appearance and a functionality of the first and the second GUI objects, the executable codes comprising:
    - a first plurality of instructions for receiving a first non-graphical data of the parameter from the second controller and rendering the first GUI object in response to any change to the parameter;
    - a second plurality of instructions for receiving the user input from the input device, rendering the second GUI object in response to the user input, and sending a second non-graphical data of the user input to the second controller;
- a processor coupled to the second controller and the at least one memory, wherein the processor (1) reads the first opcode, the first operand, the second opcode, and the second operand, (2) reads the executable codes, (3) executes the executable codes to (a) receive the first non-graphical data of the parameter from the second controller, (b) render the first GUI object in response to any change to the parameter independently from the second controller, (c) receive the user input from the input device, (d) render the second GUI object in response to the user input independently from the second controller, and (e) send the second non-graphical data of the user input to the second controller, and (4) saves the rendered GUI object in the frame buffer.

3. The first controller of claim 2, further comprising an output device coupled to the frame buffer to receive the GUI, the output device displaying the GUI to the user.

4. The first controller of claim 3, wherein the output device is a liquid crystal display ("LCD").

5. The first controller of claim 4, further comprising a pixel serializer coupled between the frame buffer and the LCD, the pixel serializer outputting each line of the GUI in the frame buffer to the LCD.

6. The fist controller of claim 2, wherein the parameter is a status of the device from the second controller to the user.

7. The first controller of claim 6, wherein the first GUI object is a text field.

8. The first controller of claim 2, further comprising another memory coupled to the processor, the another memory storing the document, the processor loading the document from the another memory to the at least one memory.

9. The first controller of claim 2, wherein the second controller further comprises another memory storing the document, the second controller reading the document from the another memory and sending the document to the first controller, the first controller loading the document in the at least one memory.

10. The first controller of claim 2, wherein the user input is a command from the user to the second controller for controlling the device.

11. The first controller of claim 10, wherein the input device is one of a touch screen, a key pad, an infrared remote, and a voice decoder.

12. The first controller of claim 11, wherein the second GUI object is one of a button and a list.

13. A method for a first controller to generate a graphic user interface ("GUI") for a device independently from a second controller that monitors and controls the device, comprising:
- loading a document into a document buffer in at least one memory, the document defining an appearance of the GUI, the document comprising:
  - a first operation code ("opcode") identifying a first GUI object, the first GUI object being a graphical presentation of a parameter, the parameter being from the second controller;
  - a first operand of the first opcode, the first operand identifying the parameter of the first GUI object;
  - a second opcode identifying a second GUI object, the second GUI object being a graphical presentation of a user input, the user input being from an input device;
  - a second operand of the second opcode, the second operand identifying a destination of the user input;
- in response to the first opcode, the first operand, the second opcode, and the second operand, retrieving executable codes of the first and the second GUI objects from a GUI object library stored in the at least one memory, the executable codes defining an appearance and a functionality of the first and the second GUI objects, the executable codes comprising:
  - a first plurality of instructions for receiving a first non-graphical data of the parameter from the second controller and rendering the first GUI object in response to any change to the parameter;
  - a second plurality of instructions for receiving the user input from the input device, rendering the graphic presentation of the second GUI object in response to the user input, and sending a second non-graphical data of the user input to the second controller;
- independently from the second controller, executing the executable codes to receive the first non-graphical data of the parameter from the second controller, render the first GUI object in response to any change to the parameter, receive the user input from the input device, render the second GUI object in response to the user input, and send the second non-graphical data of the user input to the second controller;
- writing the rendered GUI object in a frame buffer in the at least one memory; and
- sending the rendered GUI object from the frame buffer to an output device, wherein the output device displays the GUI to a user.

14. The method of claim 13, wherein the output device is a liquid crystal display ("LCD").

15. The method of claim 13, wherein the parameter is a status of the device from the second controller to the user.

16. The method of claim 15, wherein said rendering the first GUI object comprises drawing a text field.

17. The method of claim 13, further comprising reading the document from another memory prior to said loading the document into the at least one memory.

18. The method of claim 13, further comprising receiving the document from the second controller prior to said loading the document into the at least one memory.

19. The method of claim 13, wherein the user input is a command from the user to the second controller for controlling the device.

20. The method of claim 19, wherein the input device is one of a touch screen, a key pad, an infrared remote, and a voice decoder.

21. The method of claim 20, wherein said rendering the second GUI object comprises drawing one of a button and a list.

* * * * *

UNITED STATES PATENT AND TRADEMARK OFFICE
CERTIFICATE OF CORRECTION

PATENT NO.       : 7,100,118 B1                                             Page 1 of 1
APPLICATION NO. : 09/692997
DATED            : August 29, 2006
INVENTOR(S)      : Kenneth J. Klask It is certified that error appears in the above-identified patent and that said Letters Patent is hereby corrected as shown below:

Column 9, line 54, claim 1: Cancel "GUT" and substitute --GUI--.

Signed and Sealed this

Fifth Day of June, 2007

JON W. DUDAS
*Director of the United States Patent and Trademark Office*